(12) United States Patent
Gonzalez et al.

(10) Patent No.: US 12,026,624 B2
(45) Date of Patent: Jul. 2, 2024

(54) SYSTEM AND METHOD FOR LOSS FUNCTION METALEARNING FOR FASTER, MORE ACCURATE TRAINING, AND SMALLER DATASETS

(71) Applicant: Cognizant Technology Solutions U.S. Corporation, College Station, TX (US)

(72) Inventors: Santiago Gonzalez, Austin, TX (US); Risto Miikkulainen, Stanford, CA (US)

(73) Assignee: Cognizant Technology Solutions U.S. Corporation, College Station, TX (US)

( * ) Notice: Subject to any disclaimer, the term of this patent is extended or adjusted under 35 U.S.C. 154(b) by 322 days.

(21) Appl. No.: 16/878,843

(22) Filed: May 20, 2020

(65) Prior Publication Data
US 2023/0141655 A1    May 11, 2023

Related U.S. Application Data

(60) Provisional application No. 62/851,766, filed on May 23, 2019.

(51) Int. Cl.
G06N 3/086 (2023.01)
G06N 3/045 (2023.01)

(52) U.S. Cl.
CPC ............. *G06N 3/086* (2013.01); *G06N 3/045* (2023.01)

(58) Field of Classification Search
None
See application file for complete search history.

(56) References Cited

U.S. PATENT DOCUMENTS

| | | | |
|---|---|---|---|
| 5,140,530 A | 8/1992 | Guha et al. | |
| 5,761,381 A | 6/1998 | Arci et al. | |
| 5,845,266 A | 12/1998 | Lupien et al. | |
| 5,920,848 A | 7/1999 | Schutzer et al. | |
| 5,930,780 A | 7/1999 | Hughes et al. | |
| 6,240,399 B1 | 5/2001 | Frank et al. | |

(Continued)

FOREIGN PATENT DOCUMENTS

| | | |
|---|---|---|
| EP | 0762294 A2 | 3/1997 |
| EP | 2422276 | 2/2012 |

(Continued)

OTHER PUBLICATIONS

Hansen, N. and Ostermeier, A. (1997). Convergence properties of evolution strategies with the derandomized covariance matrix adaptation: The ($\mu$, $\mu$I, $\lambda$)-CMA-ES. In Zimmermann, H.-J., editor, Proceedings of EUFIT'97, Fifth European Congress on Intelligent Techniques and Soft Computing, pp. 650654, Verlag Mainz, Aachen, Germany.*

(Continued)

*Primary Examiner* — Richard N Scheunemann
(74) *Attorney, Agent, or Firm* — Dawn-Marie Bey; Bey & Cotropia PLLC

(57) ABSTRACT

A genetic loss function optimization (hereafter "GLO") process uses a genetic algorithm to construct candidate loss functions as trees. The process takes the best candidate loss functions from this set and optimizes the coefficients thereof using covariance-matrix adaptation evolutionary strategy (hereafter "CMA-ES"), resulting in new loss functions showing substantial improvements in accuracy, convergence speed, and data requirements.

16 Claims, 9 Drawing Sheets

(56) References Cited

U.S. PATENT DOCUMENTS

| | | | |
|---|---|---|---|
| 6,249,783 | B1 | 6/2001 | Crone et al. |
| 7,013,344 | B2 | 3/2006 | Megiddo |
| 7,246,075 | B1 | 7/2007 | Testa |
| 7,370,013 | B1 | 5/2008 | Aziz et al. |
| 7,444,309 | B2 | 10/2008 | Branke et al. |
| 8,331,632 | B1* | 12/2012 | Mohanty ............. G06F 18/2137 |
| | | | 382/160 |
| 8,639,545 | B2 | 1/2014 | Cases et al. |
| 8,768,811 | B2 | 7/2014 | Hodjat et al. |
| 9,053,431 | B1 | 6/2015 | Commons |
| 9,466,023 | B1 | 10/2016 | Shahrzad et al. |
| 9,785,886 | B1 | 10/2017 | Andoni et al. |
| 2002/0019844 | A1 | 2/2002 | Kurowski et al. |
| 2002/0174079 | A1* | 11/2002 | Mathias ................. G06N 3/086 |
| | | | 706/15 |
| 2003/0014379 | A1 | 1/2003 | Saias et al. |
| 2003/0158887 | A1 | 8/2003 | Megiddo |
| 2004/0044633 | A1* | 3/2004 | Chen ...................... G06N 3/086 |
| | | | 706/21 |
| 2004/0143559 | A1 | 7/2004 | Ayala |
| 2004/0210545 | A1 | 10/2004 | Branke et al. |
| 2004/0254901 | A1 | 12/2004 | Bonabeau et al. |
| 2005/0033672 | A1 | 2/2005 | Lasry et al. |
| 2005/0122337 | A1* | 6/2005 | Chen ...................... G06T 11/40 |
| | | | 345/545 |
| 2005/0136480 | A1 | 6/2005 | Brahmachari et al. |
| 2005/0187848 | A1 | 8/2005 | Bonissone et al. |
| 2005/0197875 | A1 | 9/2005 | Kauffman |
| 2005/0198103 | A1 | 9/2005 | Ching |
| 2006/0218107 | A1 | 9/2006 | Young |
| 2007/0100907 | A1 | 5/2007 | Bayer |
| 2007/0143198 | A1 | 6/2007 | Brandes et al. |
| 2007/0143759 | A1 | 6/2007 | Ozgur et al. |
| 2007/0150435 | A1 | 6/2007 | Murakawa et al. |
| 2007/0185990 | A1 | 8/2007 | Ono et al. |
| 2008/0071588 | A1 | 3/2008 | Eder |
| 2008/0228644 | A1 | 9/2008 | Birkestrand et al. |
| 2009/0125370 | A1 | 5/2009 | Blondeau et al. |
| 2009/0327178 | A1 | 12/2009 | Jacobson |
| 2010/0030720 | A1 | 2/2010 | Stephens |
| 2010/0111991 | A1 | 5/2010 | Raitano et al. |
| 2010/0182935 | A1 | 7/2010 | David |
| 2010/0256795 | A1 | 10/2010 | McLaughlin et al. |
| 2010/0257228 | A1 | 10/2010 | Staggs et al. |
| 2010/0257605 | A1 | 10/2010 | McLaughlin et al. |
| 2010/0274742 | A1 | 10/2010 | Hodjat et al. |
| 2012/0239592 | A1 | 9/2012 | Esbensen |
| 2012/0313798 | A1 | 12/2012 | Markram |
| 2013/0311412 | A1 | 11/2013 | Lazar et al. |
| 2014/0011982 | A1 | 1/2014 | Marasco et al. |
| 2014/0278130 | A1* | 9/2014 | Bowles ................. G16B 25/10 |
| | | | 702/19 |
| 2015/0288573 | A1 | 10/2015 | Baughman et al. |
| 2016/0048753 | A1 | 2/2016 | Sussillo et al. |
| 2016/0063359 | A1 | 3/2016 | Szegedy et al. |
| 2016/0329047 | A1 | 11/2016 | Tur |
| 2016/0364522 | A1 | 12/2016 | Frey et al. |
| 2017/0109355 | A1 | 4/2017 | Li et al. |
| 2017/0193367 | A1 | 7/2017 | Miikkulainen et al. |
| 2017/0206317 | A1* | 7/2017 | Ratwani ................. G16H 40/63 |
| 2017/0213156 | A1 | 7/2017 | Hammond et al. |
| 2017/0323636 | A1 | 11/2017 | Xiao et al. |
| 2018/0053092 | A1 | 2/2018 | Hajizadeh |
| 2018/0114115 | A1 | 4/2018 | Liang et al. |
| 2018/0114116 | A1 | 4/2018 | Liang et al. |
| 2018/0240041 | A1 | 8/2018 | Koch et al. |
| 2018/0336457 | A1* | 11/2018 | Pal ............................ G06N 3/08 |
| 2019/0019582 | A1* | 1/2019 | Wallis ..................... G06N 3/084 |
| 2020/0410157 | A1 | 12/2020 | Van De Kerkhof |

FOREIGN PATENT DOCUMENTS

| | | |
|---|---|---|
| EP | 2422278 | 2/2012 |
| JP | H0810804 | 1/1996 |
| JP | 08-110804 | 4/1996 |
| JP | H09114797 | 5/1997 |
| JP | 2001325041 | 11/2001 |
| JP | 2003044665 | 2/2003 |
| JP | 2004240671 | 8/2004 |
| JP | 2004302741 | 10/2004 |
| JP | 2005190372 | 6/2007 |
| JP | 2007207173 | 8/2007 |
| JP | 2007522547 | 8/2007 |
| JP | 2008129984 | 6/2008 |
| WO | WO 2005/073854 | 8/2005 |
| WO | WO 2010/120440 | 10/2010 |
| WO | WO 2017/161233 | 9/2017 |
| WO | WO 2018/211138 | 11/2018 |
| WO | WO 2018/213840 | 11/2018 |

OTHER PUBLICATIONS

Santiago Gonzalez, et al., "Improved Training Speed, Accuracy, and Data Utilization Through Loss Function Optimization," Version 1, arXiv: 1905.11528v1, dated May 27, 2019.

Santiago Gonzalez, et al., "Improved Training Speed, Accuracy, and Data Utilization Through Loss Function Optimization," Version 2, arXiv: 1905.11528v2, dated Feb. 10, 2020.

Santiago Gonzalez, et al., "Improved Training Speed, Accuracy, and Data Utilization Through Loss Function Optimization," Version 3, arXiv: 1905.11528v3, dated Apr. 27, 2020.

J. T. Barron, "A General and Adaptive Robust Loss Function," arXiv: 1701.03077, 2017.

K. Janocha and W. M. Czarnecki, "On Loss Functions for Deep Neural Networks in Classification," arXiv: 1702.05659, 2017.

N. Hansen and A. Ostermeier, "Adapting Arbitrary Normal Mutation Distributions in Evolution Strategies: The Covariance Matrix Adaptation," Proceedings of IEEE International Conference on Evolutionary Computation, IEEE, pp. 312-317, 1996.

Hansen et al., "Completely Derandomized Self-adaptation in Evolution Strategies," Evolutionary Computation, vol. 9, No. 2, pp. 159-195, 2001.

N. Hansen et al., "Evaluating the CMA Evolution Strategy on Multimodal Test Functions," in International Conference on Parallel Problem Solving from Nature, Springer, 2004, pp. 282-291.

A. Krizhevsky, et al., "ImageNet Classification With Deep Convolutional Neural Networks," NIPS'12: Proceedings of the 25th International Conference on Neural Information Processing Systems, vol. 1, Dec. 2012, pp. 1097-1105.

Gonzalez, et al., "Evolving Loss Functions With Multivariate Taylor Polynomial Parameterizations," Version 1, published arXiv: 2002.00059v1, Jan. 31, 2020.

Gonzalez, et al., "Evolving Loss Functions With Multivariate Taylor Polynomial Parameterization," Version 2, published arXiv: 2002.00059v2, Feb. 10, 2020.

Gonzalez, et al., "Optimizing Loss Functions Through Multivariate Taylor Polynomial Parameterization," Version 3 (published arXiv:2002.00059v3), Jun. 6, 2020.

H. Li, et al., "Visualizing the loss landscape of neural nets," Advances in Neural Information Processing Systems 31, pp. 6389-6399 (Curran Associates, Inc., 2018).

Liang, et al., "Population-Based Training for Loss Function Optimization," arXiv:2002.04225v1 (Feb. 11, 2020).

"Python vs. R for Artificial Intelligence, Machine Learning, and Data Science," by Scenario or Task by Alex Castrounis of Innoarchitech, published online by O'Reilly Media, Copyright InnoArchiTech LLC 2020.

Production vs Development Artificial Intelligence and Machine Learning, by Alex Castrounis of Innoarchitech, published online by O'Reilly Media, Copyright InnoArchiTech LLC 2020.

"Advanced Analytics Packages, Frameworks, and Platforms by Scenario or Task," by Alex Castrounis of Innoarchitech, published online by O'Reilly Media, Copyright InnoArchiTech LLC 2020.

Santiago Gonzalez, "Loss Function Optimization Using Evolutionary Computation and Multivariate Function Approximators, Particularly Multivariate Taylor Expansions," 5 pp., Aug. 22, 2019.

(56) References Cited

OTHER PUBLICATIONS

Fernando et al., "Pathnet: Evolution channels gradient descent in super neural networks," arXiv preprint arXiv:1701.08734 (2017), 16 pages.
Yang et al., "Deep multi-task representation learning: A tensor factorisation approach," arXiv preprint arXiv:1605.06391 (2016), 12 pages.
Shazeer et al., "Outrageously large neural networks: The sparsely-gated mixture-of-experts layer," arXiv preprint arXiv:1701.06538 (2017), 19 pages.
Misra et al., "Cross-stitch networks for multi-task learning," In Proceedings of the IEEE Conference on Computer Vision and Pattern Recognition, pp. 3994-4003. 2016.
Li, Xiaodong, and Michael Kirley, 'The effects of varying population density in a fine--grained parallel genetic algorithmi' Evolutionary Computation. 2002. CEC'02. Proceedings of the 2002 Congress on. vol. 2. IEEE. 2002.
Fidelis. Marcos Vinicius, Heitor S. Lopes, and Alex A. Freitas. "Discovering comprehensible classification rules with a genetic algorithm." Evolutionary Computation. 2000. Proceedings of the 2000 Congress on. vol. 1. IEEE. 2000.
Dec. 23, 2008 International Search Report and Written Opinion for PCT/US2008/82876, 10 pp.
Koza. J.R, "Genetic Programming: On the Programming of Computers by Means of Natural Selection", Dec. 1992, MIT Press. pp. 1-609.
Nov. 26, 2012 Extended EP SR for EP 08847214, 9 pp.
Enee, Gilles et al., "Classifier Systems Evolving Multi-Agent System with Distributed Elitism," Proc. 1999 Congress on Evolutionary Computation (CEC'99) vol. 3:6, Jul. 1999, pp. 1740-1746.
Streichert F., "Introduction to Evolutionary Algorithms," paper to be presented Apr. 4, 2002 at the Frankfurt MathFinance Workshop Mar. 30, 2002, Frankfurt, Germany, XP55038571, 22 pp. (retrieved from the Internet: URL: http://www.ra.cs.uni-tuebingen.de/mita rb/streiche/ publications/Introduction to E volutionary Algorithms.pdf).
Poli R et al., "Genetic Programmig: An introductory Tutorial and a Survey of Techniques and Applications," Univ. Essex School of Computer Science and Eletronic Engineering Technical Report No. CES-475, Oct. 2007, 112 pp.
Jun. 16, 2011 Written Opinion from Singapore Patent Office in related application SG 201003127-6, 9 pp.
Apr. 20, 2012 Exam Report for related application AU 2008323758, 2 pp.
Sakauchi et al., Unifine: A Next Generation Financial Solution System of Nihon Unisys Ltd., Technology Review 'Unisys,' Japan, Nihon Unisys Ltd., Feb. 28, 2006, vol. 25, No. 4, pp. 14-15.
JP 2010-533295, Office Action dated Apr. 16, 2013, 12 pages.
JP 2012-508663—Office Action dated Apr. 1, 2014, 6 pages (with English Translation).
JP 2012-508660—Office Action dated Apr. 1, 2014, 8 pages (with English Translation).
International Search Report mailed Jun. 29, 2010 in PCT/US10/ 32841.
M.-R Akbarzadeh-T. et al., "Friendship Modeling for Cooperative Co-Evolutionary Fuzzy Systems: A Hybrid GA-GP Algorithm," Proc. 22nd Int'l Conf. of N. American FIPS, 2003, pp. 61-66.
JE Bartlett II, et al., "Organizational Research: Determining Appropriate Sample Size in Survey Research," IT, Learning, and Performance Journal 19(1) 2001, 8pp.
JC Bongard, et al., "Guarding Against Premature Convergence while Accelerating Evolutionary Search," Proc. 12th annual conf. of Genetic and evolutionary computation, 20201, 8pp.
M Davarynejad, "Fuzzy Fitness Granulation in Evolutionary Algorithms for complex optimization," Master of Science Thesis, Ferdowsi Univ. of Mashhad, 2007, 30pp.
M Davarynejad et al., "A Novel General Framework for Evolutionary Optimization: Adaptive Fuzzy Fitness Granulation," CEC 2007, 6pp.

E Ducheyne et al., "Is Fitness Inheritance Useful for Real-World Applications?" Evolutionary Multi-Criterion Optimization, ser. LNCS 2631, 2003, pp. 31-42.
JM Fitzpatrick et al., "Genetic Algorithms in Noisy Environments," Machine Learning 3: 101-120, 1988.
A Gaspar-Cunha et al., "A Multi-Objective Evolutionary Algorithm Using Neural Networks to Approximate Fitness Evaluations," Int'l J. Computers, Systems and Signals, 6(1) 2005, pp. 18-36.
PS Georgilakis, "Genetic Algorithm Model for Profit Maximization of Generating Companies in Deregulated Electricity Markets," Applied Artificial Intelligence, 2009, 23:6,538-552.
G Gopalakrishnan et al., "Optimal Sampling in a Noisy Genetic Algorithm for Risk-Based Remediation Design," Bridging the gap: meeting the world's water and environmental resources challenges, Proc. World Water Congress 2001, 8 pp.
H Juille, "Evolution of Non-Deterministic Incrementa: Algorithms as a New Approach for Search in State Spaces," Proc. 6th Int'l Conf. on Genetic Algorithms, 1995, 8pp.
A Kosorukoff, "Using incremental evaluation and adaptive choice of operators in a genetic algorithm," Proc. Genetic and Evolutionary Computation Conference, GECCO-2002, 7pp.
A Nelson, "Fitness functions in evolutionary robotics: A survey and analysis," Robotics and Autonomous Systems 57 (2009) 345-370.
S Remde, et al. "Evolution of Fitness Functions to Improve Heuristic Performance," Lion 2007 II, LNCS 5313 pp. 206-219.
J Sacks, et al. "Design and Analysis of Computer Experiments," Statistical Science 4:4, 1989, 409-435.
M Salami, et al., "A fast evaluation strategy for evolutionary algorithms," Applied Soft Computing 2/3F (2003) 156-173.
J Torresen, "A Dynamic Fitness Function Applied to Improve the Generalisation when Evolving a Signal Processing Hardware Architecture," Proc. EvoWorkshops 2002, 267-299 (12 pp).
BA Whitehead, "Genetic Evolution of Radial Basis Function Coverage Using Orthogonal Niches," IEEE Transactions on Neural Networks, 7:6, (1996) 1525-28.
AS Wu et al., "An incremental fitness function for partitioning parallel taks," Proc. Genetic and Evolutionary Computation Conf. (2001) 8pp.
Supplementary European Search Report mailed Oct. 12, 2012 in EP 10770288.
Supplementary European Search Report mailed Oct. 9, 2012 in EP 10770287.
Lopez Haimes et al., "MRMOGA: parallel evolutionary multi-objective optimization using multiple resolutions," In: Proceedings of IEEE Congress on Evolutionary Computation, 2284-2301, 2005.
Castillo Tapia et al. Applications of multi-objective evolutionary algorithms in economics and finance: A survey. IEEE Congress on Evolutionary Computation 2007: 532-539.
Bui et al. "Local Models: An Approach to Distributed Multi-objective Optimization, Computational Optimization and Applications," Computational Optimization and Application Journal, 2009, 42(1), 105-139.
Leon et al. Parallel Hypervolume-Guideed Hyperheuristic for Adapting the Multi-objective Evolutionary Island Model. NICSO 2008: 261-272.
Aug. 1, 2012 Office Action in U.S. Appl. No. 13/443,546, 12 pp.
Jul. 27, 2012 Final Office Action in U.S. Appl. No. 12/267,287, 14 pp.
AU 2010241594—Examination Report dated Oct. 8, 2013, 3 pages.
Myers. R.H. and Montgomery, D.C., "Response Surface Methodology: Process and Product Optimization Using Designed Experiments," New York: John Wiley and Sons, Inc., 1995, pp. 1-700.
Schoreels C., "Agent based Genetic Algorithm Employing Financial Technical Analysis for Making Trading Decisions Using Historical Equity Market Data," IEEE/WIC/ACM International Conference on Intelligent Agent Technology (IAT2004), Beijing, China, 2004, pp. 421-424.
International Search Report mailed Jul. 2, 2010 in PCT/US10/ 32847.
Stanley, Kenneth O., et al., "Real-lime evolution of neural networks in the NERO video game." AAAI. vol. 6. 2006, 4 pages.
U.S. Appl. No. 15/794,913—Non-Provisional Application filed Oct. 26, 2017, 73 pages.

(56) References Cited

OTHER PUBLICATIONS

Scott, E. O., et al., "Understanding Simple Asynchronous Evolutionary Algorithms," Jan. 17-20, 2015, 15 pp.
International Search Report and Written Opinion for Application No. PCT/US2018/064520, dated March 4. 2019. 8 pp.
Xu, et al., "Inference of Genetic Regulatory Networks With Recurrent Neural Network Models Using Particle Swarm Optimization," Missouri University of Science and Technology, Oct. 2017 [retrieved on Feb. 14, 2019], Retrieved from the Internet: http://scholarsmine.mst.edu/cgi/viewcontent.cgi?article=1751&context=ele_comeng_facwork.
N. Garcia-Pedrajas, et al., "Cooperative Coevolution of Artificial Neural Network Ensembles for Pattern Classification," IEEE Transactions on Evolutionary Computation, vol. 9, No. 3, Jun. 2005.
Snoek, et al., "Scalable Bayesian Optimization Using Deep Neural Networks", 2015, 13 pages.
James Bradbury, et al., "Quasi-Recurrent Neural Networks," arXiv:1611.01576v2, Nov. 21, 2016, 11 pp.; Retrieved from the Internet: https//arxiv.org/pdf/1611.01576.pdf?fbclid=IwAR3hreOvBGmJZe54-631X49XedcbsQoDYIRu87BcCHEBf vMKF8FDKK 7Nw.
Yin, et al., "ABCNN: Attention-Based Convolutional Neural Network for Modeling Sentence Pairs," Transactions of the Association for Computational Linguistics, vol. 4, pp. 259-272, 2016, Retrieved on Aug. 4, 2019, Retrieved from the Internet: https://www.mitpressjounrals.org/doi/pdf/10.1162/tacl_a_00097.
International Search Report and Written Opinion for PCT Application No. PCT/US2019/017175, dated Jun. 5, 2019, 10 pp.
E. Meyerson and R. Miikkulainen, "Pseudo-Task Augmentation: From Deep Multitask Learning to Intratask Sharing and Back," ICML, 2018.
Hodjat et al., "Chapter 5: Introducing an Age-Varying Fitness Estimation Function." Genetic Programming Theory and Practice X. Ed. Riolo et al., Springer Apr. 19, 2013, pp. 59-71.
Kenneth O. Stanley and Risto Miikkulainen, "Evolving Neural Networks Through Augmenting Topologies," Evolutionary Computation, 10(2):99-127, 2002.
International Search Report and Written Opinion for PCT Application No. PCT/US18/64428, dated Mar. 26, 2019, 12 pp.
International Search Report and Written Opinion for PCT Application No. PCT/US18/65472, dated Mar. 27, 2019, 8 pp.
Bredeche, et al., "On-Line, On-Board Evolution of Robot Controllers," In: Artificial Evolution: 9th International Conference, Evolution Artificielle, EA, 2009, Strasbourg, France, Oct. 26-28, 2009 [online], [retrieved on Mar. 15, 2019], Retrieved from the Internet: https://dl.acm.org/citation.cfm?id=1883723.1883738.
Rosenbaum, et al., "Routing Networks: Adaptive Selection of Non-Linear Functions for Multi-Task Learning," In: Cornell University Library/Computer Science/Machine Learning, Dec. 31, 2017 [online] [retrieved on Mar. 15, 2019], Retrieved from the Internet: https://arxiv.org/abs/1711.01239v2.
Bonadiman, et al., "Multitask Learning with Deep Neural Networks for Community Question Answering," In: Cornell University Library/Computer Science/Machine Learning, Feb. 13, 2017 [online] [retrieved on Mar. 15, 2019], Retrieved from the Internet: https://arxiv.org/abs/1702.03706.
Ruder, "An Overview of Multi-Task Learning in Deep Neural Networks," In: Cornell University Library/Computer Science/Machine Learning, Jun. 15, 2017 [online] [retrieved on Mar. 15, 2019], Retrieved from the Internet: https://arxiv.org/abs/1706.05098.
J. Z. Liang, E. Meyerson, and R. Miikkulainen, 2018, Evolutionary Architecture Search for Deep Multitask Networks, GECCO (2018).
E. Meyerson and R. Miikkulainen, 2018, "Beyond Shared Hierarchies: Deep Multitask Learning Through Soft Layer Ordering," ICLR (2018).
R. Miikkulainen, J. Liang, E. Meyerson, et al., 2017, "Evolving Deep Neural Networks," arXiv preprint arXiv:1703.00548 (2017).
U.S. Appl. No. 15/794,905, titled "Evolution of Deep Neural Network Structures," filed on Oct. 26, 2017.

U.S. Appl. No. 15/794,913, titled "Cooperative Evolution of Deep Neural Network Structures," filed on Oct. 26, 2017.
U.S. Appl. No. 15/915,028, titled "Asynchronous Evaluation Strategy for Evolution of Deep Neural Networks," filed on Mar. 3, 2018.
Risto Miikkulainen, "Evolving Multitask Neural Network Structure," The University of Texas at Austin and Sentient Technologies, Inc., Aug. 26, 2013.
Moriarty, David E., et al. "Forming neural networks through efficient and adaptive coevolution." Evolutionary computation 5.4 (1997) (Year: 1997).
Lee, Chi-Ho, et al. "Evolutionary ordered neural network with a linked-list encoding scheme." Proceedings of IEEE International Conference on Evolutionary Computation. IEEE, 1996 (Year: 1996).
Utech, J., et al. "An evolutionary algorithm for drawing directed graphs." Proc. of the Int. Conf. on Imaging Science, Systems and Technology. 1998 (Year: 1998).
International Search Report and Written Opinion for PCT App. No. PCT/US19/61198, dated Mar. 11, 2020, 15 pp.
International Preliminary Report on Patentability for PCT App. No. PCT/US2019/061198, dated Nov. 18, 2020, 24 pp.
Ustun, et al., "Determination of optimal support vector regression parameters by genetic algorithms and simplex optimization", Analytica Chimica Acta 544 (2005) 292-305 (Year: 2005).
Ian Goodfellow, et al., "Generative Adversarial Nets," Proceedings of the International Conference on Neural Information Processing Systems (NIPS 2014), pp. 2672-2680.
Joseph Rocca, "Understanding Generative Adversarial Networks (GANs), Building, step by step, the reasoning that eads to GANs" [online], Jan. 7, 2019 [retrieved Sep. 14, 2020], Towards Data Science, 21 pp., Retrieved From the Internet: https://towaxdsdatascience.com/understanding-generative-adersarial-networks-ganscd6e4651a29.
M. Arjovsky, et al., "Wasserstein generative adversarial networks," Proceedings of the 34th International Conference on Machine Learning, PMLR 70, pp. 214-223, Sydney, Australia, Aug. 6-11, 2017.
I. Gulrajani, et al., "Improved Training of Wasserstein GANs," Advances in Neural Information Processing Systems 30, pp. 5767-5777, Curran Associates, Inc., arXiv: 1704.00028v3, 2017.
X. Mao, et al., "On the Effectiveness of Least Squares Generative Adversarial Networks," IEEE transactions on pattern analysis and machine intelligence, arXiv: 1712.06391v2, 2018.
Alex Castrounis, Innoarchtech, "Advanced Analytics Packages, Frameworks, and Platforms," 29 pages, published by O'Reilly Media, Copyright InnoArchiTech LLC 2020.
Victor Costa, et al., "COEGAN: Evaluating the Coevolution Effect in Generative Adversarial Networks," arXiv: 1912.06180vl, Dec. 12, 2019, 9 pp.
Alec Radford, et al., "Unsupervised Representation Learning With Deep Convolutional Generative Adversarial Networks," arXiv: 1511.06434v2, Jan. 7, 2016, 16 pp.
James Bradbury, et al., "Quasi-Recurrent Neural Networks," arXiv:1611.01576v2, Nov. 21, 2016, 11 pp.; Retrieved from the Internet: https//arxiv.org/pdf/1611.01576.pdf?fbclid=1wAR3hreOvBGmJZe54-631X49XedcbsQoDYIRu87BcCHEBf_vMKF8FDKK_7Nw.
Yin et al., "ABCNN: Attention-Based Convolutional Neural Network for Modeling Sentence Pairs", Transactions of the Association for Computational Linguistics, (Dec. 16, 2015), vol. 4, pp. 259-272, XP081355040.
Garcia-Pedrajas, et al., "Cooperative-Coevolution-of-Artificial-Neural-Networks", 2005, 32 pages.
Miikkulainen, Risto, et al., "Evolving Deep Neural Networks," Mar. 4, 2017, 8 pp.
Stanley, Kenneth O., et al., "Real-Time Evolution of Neural Networks in the Nero Video Game," AAAI, vol. 6, 2006, 4 pp.
Risto Miikkulaiiien, "Evolving Multitask Neural Network Structure," The University of Texas at Austin and Sentient Technologies. Inc. Aug. 26, 2013, 22 pages.
"CS 224D: Deep Learning for NLP, Lecture Notes: Part III". 14 pp., Spring, 2016.
"CS 224D: Deep Learning for NLP, Lecture Notes: Part IV", 12 pp., Spring, 2015, 12 pages.

(56) References Cited

OTHER PUBLICATIONS

"CS 224D: Deep Learning for NLP, Lecture Notes: Part V", 6 pp., Spring, 2015, 6 pages.
U.S. Appl. No. 62/468,224, titled "Asynchronous Evaluation Strategy for Evolution of Deep Neural Networks," filed Mar. 7, 2017.
Aditya Rawal and Risto Miikkulainen, "From Nodes to Networks: Evolving Recurrent Neural Networks," GECCO '18, Jul. 15-19, 2018, 8 pages, Kyoto, Japan.
Julian G. Zilly, Rupesh Kumar Srivastava, Jan ICoutnik, and Jurgen Schniidhuber, "Recurrent Hiehwav Networks." CoRR abs/1607.03474. 2016 (Arxiv: 1607.03474} 13 pages.
U.S. Appl. No. 62/627,658, titled "From Nodes to Networks: Evolving Recurrent Neural Networks," filed Feb. 7, 2018.
U.S. Appl. No. 62/627, 161, titled "From Nodes to Networks: Evolving Recurrent Neural Networks," filed Feb. 6, 2018.
U.S. Appl. No. 62/598,409, titled "Evolving Multitask Neural Network Structure," filed Dec. 13, 2017.
International Search Report and Written Opinion for PCT Application No. PCT/US2008/82876, Dec. 23, 2008, 8 pp.
Tanev, I., et al., "Scalable Architecture for Parallel Distributed Implementation of Genetic Programming on Network of Workstations," J. Systems Architecture, vol. 47, Jul. 2001, pp. 557-572.
Written Opinion from Singapore Patent Office in related application SG 201003127-6, dated Jun. 16, 2011, 9 pp.
U.S. Appl. No. 14/014,063—Office Action dated May 7, 2014, 19 pages.
Georgilakis, P.S. "Genetic Algorithm Model for Profit Maximization of Generating Companies in Deregulated Electricity Markets", Applied Artificial Intelligence, Jul. 2009, 23:6,538-552.
U.S. Appl. No. 13/895,238—Office Action dated Jan. 2, 2014, 17 pages.
Jun. 22, 2011 Office Action in U.S. Appl. No. 12/267,287, 16 pp.
AU 2010241597—Examination Report dated Nov. 4, 2013, 4 pages.
Stanley et al. "Evolving neural networks through augmenting topologies." Evolutionary computation 10.2, 29 pages (2002) (Year: 2002).
Pantridge et al., Evolution of Layer Based Neural Networks: Preliminary Report, GECCO '16, pp. 1015-1022, Jul. 2016. (Year: 2016).

* cited by examiner

SYSTEM AND METHOD FOR LOSS FUNCTION METALEARNING FOR FASTER, MORE ACCURATE TRAINING, AND SMALLER DATASETS

CROSS REFERENCE TO RELATED APPLICATIONS

This application claims benefit of priority to U.S. Provisional Application No. 62/851,766 entitled "SYSTEM AND METHOD FOR LOSS FUNCTION METALEARNING FOR FASTER, MORE ACCURATE TRAINING, AND SMALLER DATASETS" filed May 23, 2019 which is incorporated herein by reference in its entirety.

Additionally, the article by Gonzalez and Miikkulainen entitled Improved Training Speed, Accuracy, and Data Utilization Through Loss Function Optimization including Version 1 (arXiv:1905.11528v1, May 27, 2019), Version 2 (arXiv:1905.11528v2, Feb. 10, 2020), and Version 3 (arXiv:1905.11528v3, Apr. 27, 2020) is incorporated herein by reference in its entirety. The article lists overlapping authors with the inventors and provides additional description and support for the embodiment set forth herein.

Computer Program Listing

A Computer Program Listing is included in an Appendix to the present specification. The Appendix is provided on a compact disc and the Computer Program Listing thereon is incorporated herein by reference in its entirety. The Computer Program Listing includes the following files which were created on Apr. 30, 2020 and included on compact disc:

| Size | File |
|---|---|
| 1,486 kb | .gitignore |
| 2,127 kb | CheckpointingTests.swift |
| 10,669 kb | CMAES.swift |
| 3,533 kb | CMAESIntegrationTests.swift |
| 2,380 kb | DecomposingPositiveDefiniteMatrix.swift |
| 1,013 kb | Double+ProbabilityDistributions.swift |
| 4,257 kb | EigenDecomposition.swift |
| 3,217 kb | EigenDecompositionTests.swift |
| 1,074 kb | LICENSE |
| 2,901 kb | LinearAlgebraTests.swift |
| 248 kb | LinuxMain.swift |
| 2,052 kb | Matrix.swift |
| 2,271 kb | ObjectiveEvaluator.swift |
| 335 kb | Package.resolved |
| 1,059 kb | Package.swift |
| 5,772 kb | README.md |
| 417 kb | Utilities.swift |
| 1,457 kb | Vector.swift |
| 287 kb | XCTestManifests.swift |

FIELD OF THE TECHNOLOGY

The field of the technology is neural network design optimization through metalearning. More specifically, metalearning applied to loss function discovery and optimization is described.

BACKGROUND

Machine learning (ML) has provided some significant breakthroughs in diverse fields including financial services, healthcare, retail, transportation, and of course, basic research. The traditional ML process is human-dependent, usually requiring an experienced data science team, to set-up and tune many aspects of the ML process. This makes the power of ML inaccessible to many fields and institutions.

Accordingly, there is on-going development to automate the process of applying machine learning to real-world problems. Hereafter referred to generally as AutoML, such automation would ideally reflect automation of each aspect of the ML pipeline from the raw dataset to the deployable models. With AutoML, it is anticipated that laymen would be able to take advantage of the power of ML to address real world problems by efficiently producing simpler solutions models that would potentially outperform human-engineered designs.

Much of the power of modern neural networks originates from their complexity, i.e., number of parameters, hyperparameters, and topology. This complexity is often beyond human ability to optimize, and automated methods are needed. An entire field of metalearning has emerged recently to address this issue, based on various methods such as gradient descent, simulated annealing, reinforcement learning, Bayesian optimization, and evolutionary computation (EC). Metalearning can generally be described as a subfield of machine learning where automatic learning algorithms are applied on metadata about machine learning experiments and is also referred to as learning to learn.

In addition to hyperparameter optimization and neural architecture search, new opportunities for metalearning have recently emerged. In particular, learning rate scheduling and adaptation can have a significant impact on a model's performance. Learning rate schedules determine how the learning rate changes as training progresses. This functionality tends to be encapsulated away in practice by different gradient-descent optimizers, such as AdaGrad and Adam which are known to those skilled in the art. While the general consensus has been that monotonically decreasing learning rates yield good results, new ideas, such as cyclical learning rates, have shown promise in learning better models in fewer epochs.

Metalearning methods have also been recently developed for data augmentation, such as AutoAugment, a reinforcement learning based approach to find new data augmentation policies. In reinforcement learning tasks, EC has proven a successful approach. For instance, in evolving policy gradients, the policy loss is not represented symbolically, but rather as a neural network that convolves over a temporal sequence of context vectors. In reward function search, the task is framed as a genetic programming problem, leveraging PushGP.

In terms of loss functions, a generalization of the $L^2$ loss was proposed with an adaptive loss parameter in J. T. Barron, "A general and adaptive robust loss function," arXiv:1701.03077 (2017) which is incorporated herein by reference in its entirety. This loss function is shown to be effective in domains with multivariate output spaces, where robustness might vary across between dimensions. Specifically, the authors found improvements in Variational Autoencoder (VAE) models, unsupervised monocular depth estimation, geometric registration, and clustering.

Additionally, as described in K. Janocha and W. M. Czarnecki, "On loss functions for deep neural networks in classification," arXiv:1702.05659 (2017) which is incorporated herein by reference in its entirety, recent work has found promise in moving beyond the standard cross-entropy loss for classification. $L^1$ and $L^2$ losses were found to have useful probabilistic properties. The authors found certain loss functions to be more resilient to noise than the cross-entropy loss.

For specific types of tasks, certain variations of the cross-entropy loss have yielded performance improvements. For example, for dense object detection, the inclusion of a new hand-designed coefficient in the cross-entropy loss aimed to increase the importance of challenging objects in scenes with many other easy objects. These types of explorations are somewhat limited in scope, both in terms of the tasks where they apply, and the space of loss functions that are considered.

Accordingly, while a wide repertoire of work now exists for optimizing many aspects of neural networks, the dynamics of training are still usually set manually without concrete, scientific methods. Notably, no existing work in the metalearning literature automatically optimizes loss functions for neural networks. Thus, a need exists in the art for an automated process for the optimization of loss functions.

SUMMARY OF CERTAIN EMBODIMENTS

In first exemplary embodiment, a process for partially training a neural network to discover and optimize a candidate loss function includes: initiating by a genetic algorithm running on at least one processor a random population of candidate loss functions, wherein each candidate loss function includes a set of optimizable coefficients; i. training by the genetic algorithm the random population of candidate loss functions on training data; ii. evaluating by the genetic algorithm a fitness of each candidate loss function based on a performance thereof on the training data in accordance with a fitness function; iii. selecting by the genetic algorithm one or more select candidate loss functions in accordance with the fitness evaluations; iv. reproducing by the genetic algorithm new candidate loss functions using the select candidate loss functions in accordance with reproduction processes to establish a next population of candidate loss functions; v. repeating steps i. to iv. for $n^{th}$ generations; selecting by the genetic algorithm one or more best candidate loss functions in accordance with the fitness evaluations from an $n^{th}$ generation population of candidate functions; optimizing by an optimization process running on at least one processor the set of coefficients of each of the one or more best candidate loss functions; and implementing an optimized best candidate loss function to train one or more predictive models.

In a second exemplary embodiment, a computer-readable medium storing instructions that, when executed by a computer, perform a process for partially training a neural network to discover and optimize a candidate loss function includes: initiating a random population of candidate loss functions, wherein each candidate loss function includes a set of optimizable coefficients; i. training the random population of candidate loss functions on training data; ii. evaluating a fitness of each candidate loss function based on a performance thereof on the training data in accordance with a fitness function; iii. selecting one or more select candidate loss functions in accordance with the fitness evaluations; iv. reproducing using the select candidate loss functions in accordance with reproduction processes to establish a next population of candidate loss functions; v. repeating steps i. to iv. for $n^{th}$ generations; selecting one or more best candidate loss functions in accordance with the fitness evaluations from an $n^{th}$ generation population of candidate functions; optimizing the set of coefficients of each of the one or more best candidate loss functions using an optimization process; and implementing an optimized best candidate loss function to train one or more predictive models.

In a third exemplary embodiment, an automated machine learning process includes: evolving candidate loss functions by a genetic algorithm running on at least one processor and selecting one or more best candidate loss functions in accordance with a fitness evaluation, wherein the candidate loss function is a tree having multiple nodes; optimizing by an optimization process running on at least one processor a set of coefficients of each of the one or more best candidate loss functions, wherein the set of coefficients is represented by a vector with dimensionality equal to the number of nodes in the best candidate loss function's tree; and implementing an optimized best candidate loss function to train one or more predictive models.

In a fourth exemplary embodiment, an automated machine learning system includes: a first subsystem including at least one processor programmed to perform a process of evolving candidate loss functions and selecting one or more best candidate loss functions in accordance with a fitness evaluation, wherein the candidate loss function is a tree having multiple nodes; a second subsystem including at least one processor programmed to perform a process of optimizing a set of coefficients of each of the one or more best candidate loss functions, wherein the set of coefficients is represented by a vector with dimensionality equal to the number of nodes in the best candidate loss function's tree; and a third subsystem including at least one processor programmed to perform a process of implementing an optimized best candidate loss function to train one or more predictive models.

DETAILED DESCRIPTION

The process described herein and exemplified through the descriptive embodiments is referred to as genetic loss function optimization (hereafter "GLO"). At a high level, GLO uses a genetic algorithm to construct candidate loss functions as trees. The process takes the best candidate loss functions from this set and optimizes the coefficients thereof using covariance-matrix adaptation evolutionary strategy (hereafter "CMA-ES"). Evolutionary computation (hereafter "EC") methods were chosen because EC is arguably the most versatile of the metalearning approaches. EC, being a type of population-based search method, allows for extensive exploration, which often results in creative, novel solutions as described in, for example, commonly owned U.S. patent application Ser. No. 15/794,905 entitled Evolution of Deep Neural Network Structures and U.S. patent application Ser. No. 16/212,830 entitled Evolutionary Architectures for Evolution of Deep Neural Networks, the entire contents of which are incorporated herein by reference. For example, EC has been successful in hyperparameter optimization and architecture design, as well as discovering mathematical formulas to explain experimental data. The inventors recognized that EC methods might be able to discover creative solutions in the loss-function optimization domain as well. As discussed further herein, using metalearned GLO loss functions, models are trained more quickly and more accurately.

The task of finding and optimizing loss functions can be framed as a functional regression problem. Per FIG. 1a, GLO accomplishes this through the following high-level steps including the step of loss function discovery S1 which uses approaches from genetic programming to build new candidate loss functions, and the step of coefficient optimization S2 which further optimizes a specific, "best," loss function, by leveraging CMA-ES to optimize coefficients.

Figure 1A:
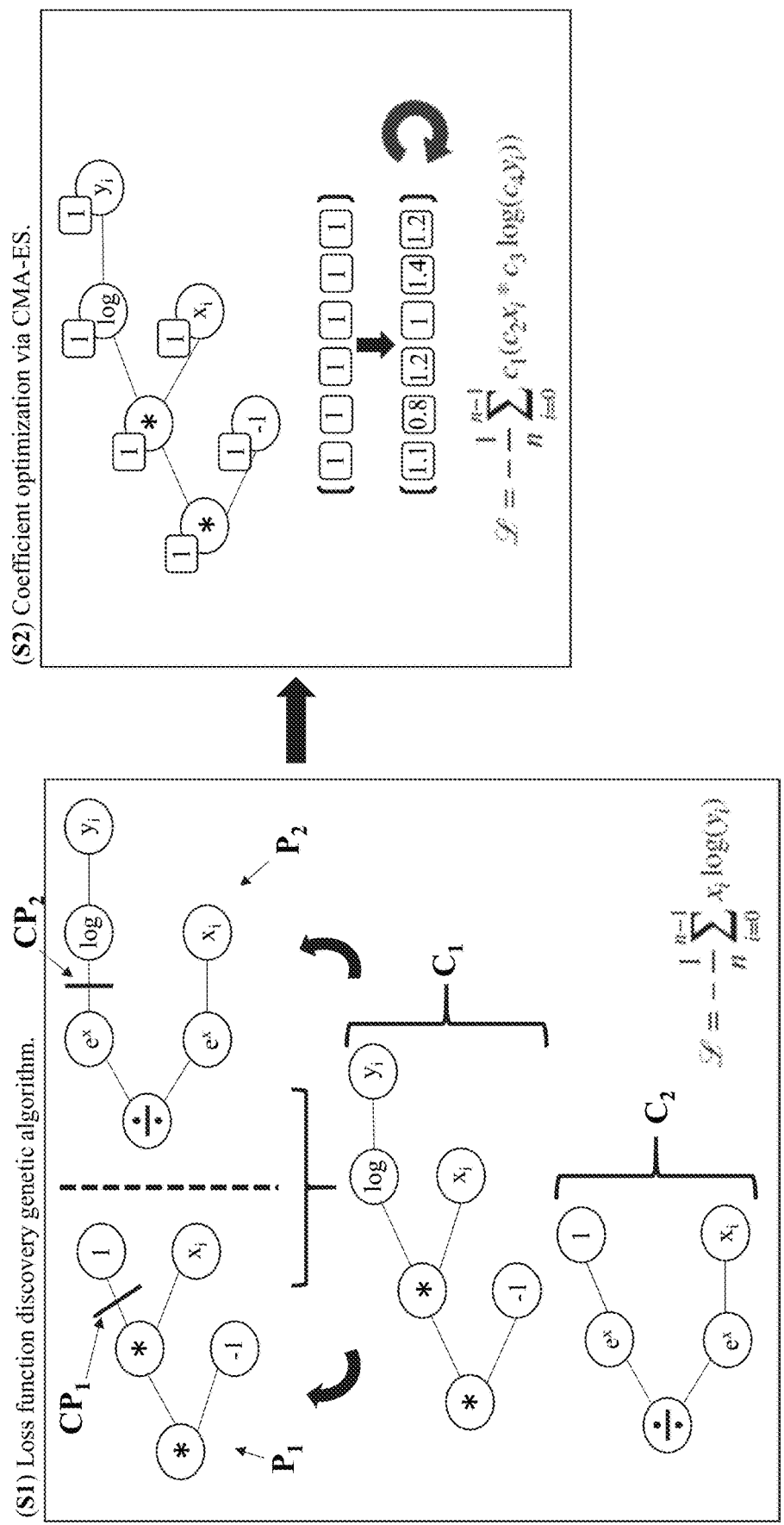
FIGS. 1a and 1b are schematics illustrating steps and system components and flow in accordance with one or more embodiments herein.
Figure 1B:
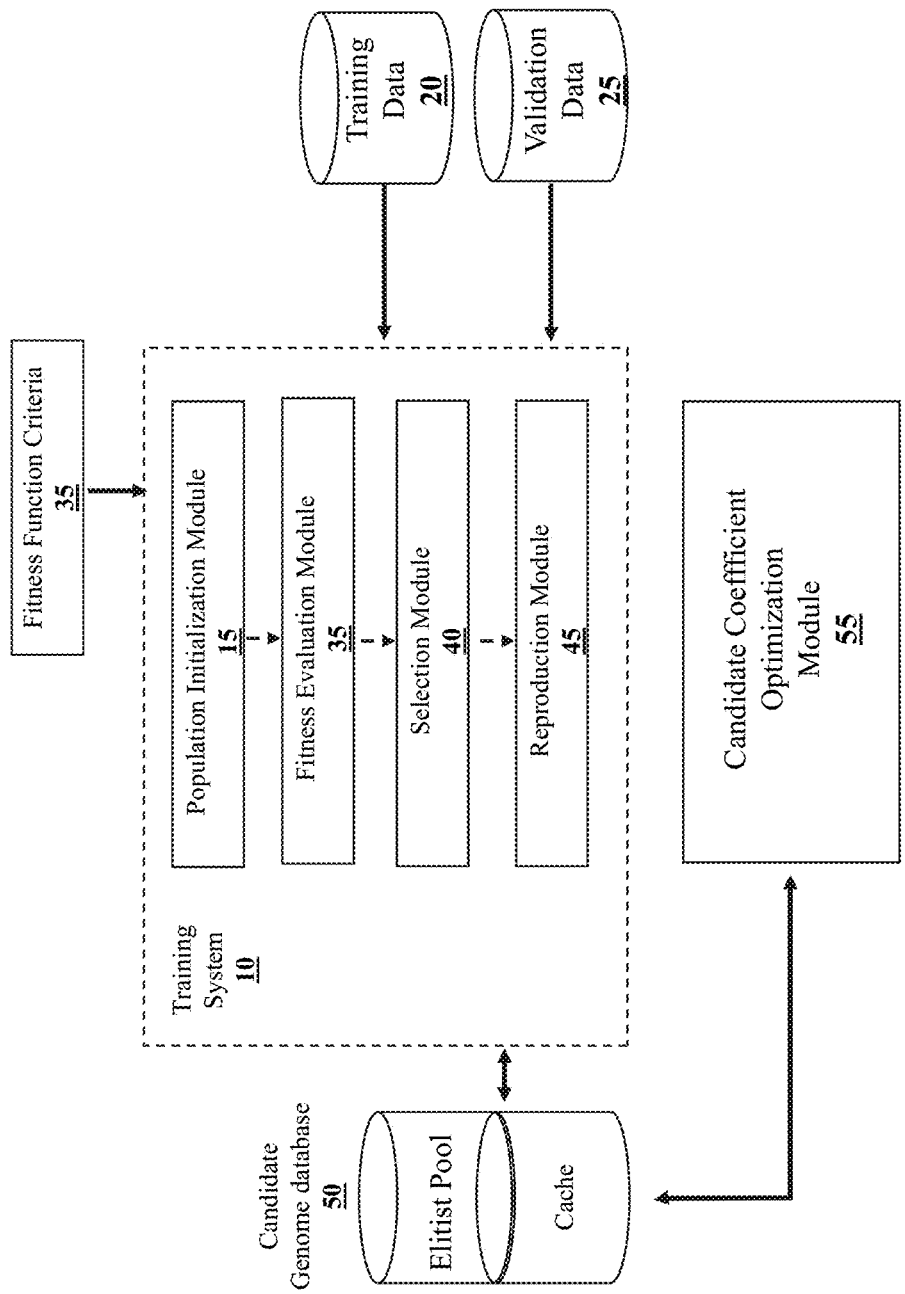

Specifically, with regard to the step of loss function discovery S1, GLO uses a population-based search approach, inspired by genetic programming, to discover new optimized loss function candidates. FIG. 1b is an exemplary schematic showing major components and flow of the framework. Under this framework, loss functions are represented as trees within a genetic algorithm. Trees are a logical choice to represent functions due to their hierarchical nature. The loss function search space is defined by the following tree nodes:

Unary Operators: $\log(\circ)$, $\circ^2$, $\sqrt{\circ}$

Binary Operators: +, *, −, ÷

Leaf Nodes: x, y, 1, −1, where x represents a true label, and y represents a predicted label. One skilled in the art recognizes that the specific operators used in this example are only a exemplary, more complex functions, such as the error function, can be included in the search space as well.

The search space is further refined by automatically assigning a fitness of 0 to trees that do not contain both at least one x and one y. Generally, a loss function's fitness within the genetic algorithm is the validation performance of a network trained with that loss function. To expedite the discovery process, and encourage the invention of loss functions that make learning faster, training does not proceed to convergence. Unstable training sessions that result in NaN values are assigned a fitness of 0. Fitness values are cached to avoid needing to retrain the same network twice. These cached values are each associated with a canonicalized version of their corresponding tree, resulting in fewer required evaluations.

Referring to FIG. 1b, a candidate loss function discovery training system 10 includes a population initialization module 15 which generates an initial population of candidate loss functions composed of randomly generated trees with a maximum depth of two. Recursively starting from the root, nodes are randomly chosen from the allowable operator and leaf nodes using a weighting (where $\log(\circ)$, x, y are three times as likely and $\sqrt{\circ}$ is two times as likely as +, *, −, ÷, 1, −1). This weighting can impart a bias and prevent, for example, the integer 1 from occurring too frequently. The initial randomly generated population is trained on training data from database 20, validated on validated data from database 25 and subjected to fitness evaluation by fitness evaluation module 35 applying fitness function criteria 30. Using fitness function determinations, a selection module 40 identifies elite candidates and applies roulette sampling to select candidates for reproduction. The genetic algorithm used in the embodiments herein has a population size of 80 and incorporates elitism with six elites per generation. Elite candidates, as well as cached candidates, are stored in the candidate genome database 50.

The selected candidates are provided to the reproduction module 45 for recombination (crossover) and mutation. Recombination is accomplished by randomly splicing two trees together. For a given pair of parent trees ($P_1$ and $P_2$), a random element is chosen in each as a crossover point ($CP_1$ and $CP_2$). The two subtrees, whose roots are the two crossover points, are then swapped with each other. FIG. 1a presents an example of this method of recombination. Both resultant child trees ($C_1$ and $C_2$) become part of the next generation. Recombination occurs with a probability of 80%.

To introduce variation into the population, the genetic algorithm has the following mutations, applied in a bottom-up fashion: integer scalar nodes are incremented or decremented with a 5% probability; nodes are replaced with a weighted-random node with the same number of children with a 5% probability; nodes (and their children) are deleted and replaced with a weighted-random leaf node with a 5%*50%=2.5% probability; leaf nodes are deleted and replaced with a weighted-random element (and weighted-random leaf children if necessary) with a 5%*50%=2.5% probability. Mutations, as well as recombination, allow for trees of arbitrary depth to be evolved. Combined, the iterative sampling, recombination, and mutation of trees within the population leads to the discovery of new loss functions which maximize fitness.

Next, the best candidates are selected for loss function coefficient optimization S2 by module 55. Loss functions found by the above genetic algorithm can all be thought of as having unit coefficients for each node in the tree. This set of coefficients can be represented as a vector with dimensionality equal to the number of nodes in a loss function's tree. The number of coefficients can be reduced by pruning away coefficients that can be absorbed by others (e.g., 3(5x+2y)=15x+6y). The coefficient vector is optimized independently and iteratively using CMA-ES. The specific variant of CMA-ES that GLO uses is ($\mu/\mu$, $\lambda$)-CMA-ES, which incorporates weighted rank-$\mu$ updates to reduce the number of objective function evaluations that are needed. The following references are descriptive of the CMA-ES configurations utilized in the present embodiments and are incorporated herein by reference in their entireties: N. Hansen and A. Ostermeier, "Adapting arbitrary normal mutation distributions in evolution strategies: The covariance matrix adaptation," in Proceedings of IEEE international conference on evolutionary computation, IEEE, 1996, pp. 312-317; Hansen et al., "Completely derandomized self-adaptation in evolution strategies," Evolutionary computation, vol. 9, no. 2, pp. 159-195, 2001 and N. Hansen et al., "Evaluating the CMA evolution strategy on multimodal test functions," in International Conference on Parallel Problem Solving from Nature. Springer, 2004, pp. 282-291. The Computer Program Listing Appendix hereto, which is incorporated herein in its entirety, provides a specific implementation.

The implementation of GLO presented in the embodiments herein uses an initial step size σ=1.5. As in the candidate loss function discovery phase, the objective function is the network's performance on a validation dataset after a shortened training period.

To highlight the usefulness and efficacy of the GLO process described in the above embodiments, GLO was evaluated on two well-known image classification task datasets: the MNIST and CIFAR-10. As discussed further below, GLO loss functions discovered on MNIST, are presented and evaluated in terms of resulting testing accuracy, training speed, training data requirements, and transferability to CIFAR-10. The initially discovered and evaluated GLO loss function is referred to herein as Baikal The MNIST Handwritten Digits and CIFAR-10 datasets are well-understood and relatively quick to train image classification datasets as is known to those skilled in the art. These datasets were selected for the initial discovery and evaluation of GLO to allow rapid iteration in the development of GLO and allow time for more thorough experimentation. The selected model architectures are simple, since achieving state-of-the-art accuracy on MNIST and CIFAR-10 is not the focus of the embodiments, rather the improvements brought about by using a discovered GLO loss function is at issue.

Both of these tasks, being classification problems, are traditionally framed with the standard cross-entropy loss (sometimes referred to as the log loss):

$$\mathcal{L}_{Log} = -\frac{1}{n}\sum_{i=0}^{n-1} x_i \log(y_i),$$

where x is sampled from the true distribution, y is from the predicted distribution, and n is the number of classes. The cross-entropy loss is used as a baseline in the following examples.

The first target task used for evaluation was the MNIST Handwritten Digits dataset, a widely used dataset where the goal is to classify 28×28 pixel images as one of ten digits. The MNIST dataset has 55,000 training samples, 5,000 validation samples, and 10,000 testing samples.

A simple Convolutional Neural Network (hereafter "CNN") architecture with the following layers is used: (1) 5×5 convolution with 32 filters, (2) 2×2 stride-2 max-pooling, (3) 5×5 convolution with 64 filters, (4) 2×2 stride-2 max-pooling, (5) 1024-unit fully-connected layer, (6) a dropout layer with 40% dropout probability, and (7) a softmax layer. ReLU activations are used. Training uses stochastic gradient descent (hereafter "SGD") with a batch size of 100, a learning rate of 0.01, and, unless otherwise specified, for 20,000 steps.

To further validate GLO, the more challenging CIFAR-10 dataset (a popular dataset of small, color photographs in ten classes) was used as a medium to test the transferability of loss functions found on a different domain (e.g., MNIST). CIFAR-10 consists of 50,000 training samples, and 10,000 testing samples.

A simple CNN architecture, inspired by AlexNet and described in A. Krizhevsky, et al., "ImageNet classification with deep convolutional neural networks," NIPS'12: Proceedings of the 25th International Conference on Neural Information Processing Systems, Volume 1 Dec. 2012, Pages 1097-1105 incorporated herein by reference in its entirety, with the following layers is used: (1) 5×5 convolution with 64 filters and ReLU activations, (2) 3×3 max-pooling with a stride of 2, (3) local response normalization with k=1, α=0.001/9, β=0.75, (4) 5×5 convolution with 64 filters and ReLU activations, (5) local response normalization with k=1, α=0.001/9, β=0.75, (6) 3×3 max-pooling with a stride of 2, (7) 384-unit fully-connected layer with ReLU activations, (8) 192-unit fully-connected, linear layer, and (9) a softmax layer.

Inputs to the network are sized 24×24×3, rather than 32×32×3 as provided in the dataset; this enables more sophisticated data augmentation. To force the network to better learn spatial invariance, random 24×24 croppings are selected from each full-size image, which are randomly flipped longitudinally, randomly lightened or darkened, and their contrast is randomly perturbed. Furthermore, to attain quicker convergence, an image's mean pixel value and variance are subtracted and divided, respectively, from the whole image during training and evaluation. CIFAR-10 networks were trained with SGD, $L^2$ regularization with a weight decay of 0.004, a batch size of 1024, and an initial learning rate of 0.05 that decays by a factor of 0.1 every 350 epochs.

The most notable loss function that GLO discovered against the MNIST dataset (with 2,000-step training for candidate evaluation) is named the Baikal loss (named as such due to its similarity to the bathymetry of Lake Baikal when its binary variant is plotted in 3D):

$$\mathcal{L}_{Baikal} = -\frac{1}{n}\sum_{i=0}^{n} \log(y_i) - \frac{x_i}{y_i}, \qquad (1)$$

where x is a sample from the true distribution, y is a sample from the predicted distribution, and n is the number of classes. Baikal was discovered from a single run of GLO. Additionally, after coefficient optimization using CMA-ES, GLO arrived at the following version of the Baikal loss:

$$\mathcal{L}_{BaikalCMA} = -\frac{1}{n}\sum_{i=0}^{n} c_0 \left( c_1 * \log(c_2 * y_i) - c_3 \frac{c_4 * x_i}{c_5 * y_i} \right), \qquad (2)$$

where $c_0$=2.7279, $c_1$=0.9863, $c_2$=1.5352, $c_3$=−1.1135, $c_4$=1.3716, $c_5$=−0.8411. This loss function, BaikalCMA, was selected for having the highest validation accuracy out of the population. The Baikal and BaikalCMA loss functions had validation accuracies at 2,000 steps equal to 0.9838 and 0.9902, respectively. For comparison, the cross-entropy loss had a validation accuracy at 2,000 steps of 0.9700. Models trained with the Baikal loss on MNIST and CIFAR-10 (to test transfer) are the primary vehicle to validate GLO's efficacy, as discussed further herein.

Figure 2:
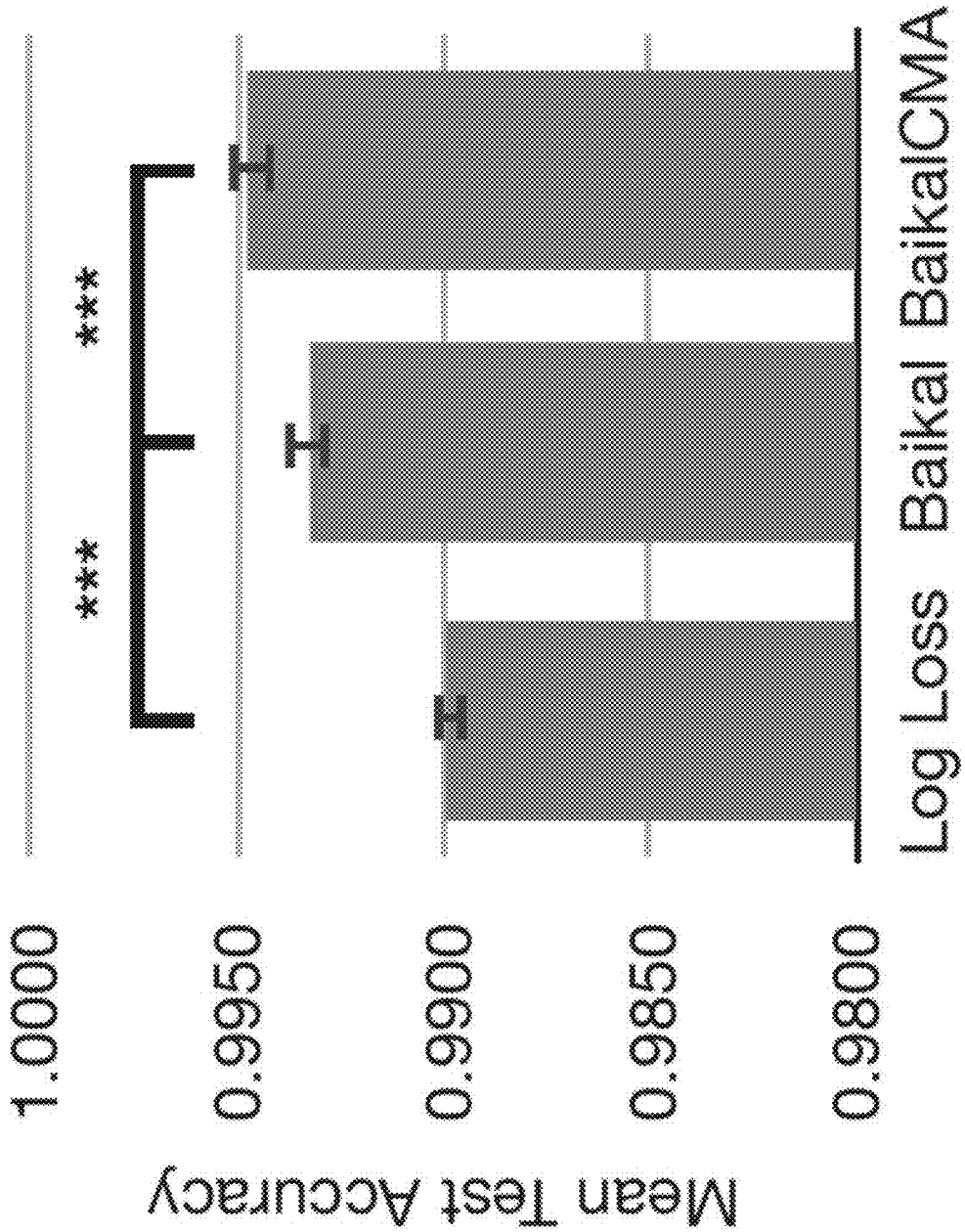
FIG. 2 compares mean testing accuracy on a first representative dataset between prior art loss functions and loss functions discovered in accordance with one or more embodiments herein.

With regard to testing accuracy, FIG. 2 shows the increase in testing accuracy that Baikal and BaikalCMA provide on MNIST over models trained with the prior art cross-entropy loss. Over 10 trained models each, the mean testing accuracies for cross-entropy loss, Baikal, and BaikalCMA were 0.9899, 0.9933, and 0.9947, respectively. This increase in accuracy from Baikal over cross-entropy loss is found to be statistically significant, with a p-value of $2.4 \times 10^{-11}$, in a heteroscedastic, two-tailed T-test, with 10 samples from each distribution. With the same significance test, the increase in accuracy from BaikalCMA over Baikal was found to be statistically significant, with a p-value of $8.5045 \times 10^{-6}$.

Figure 3:
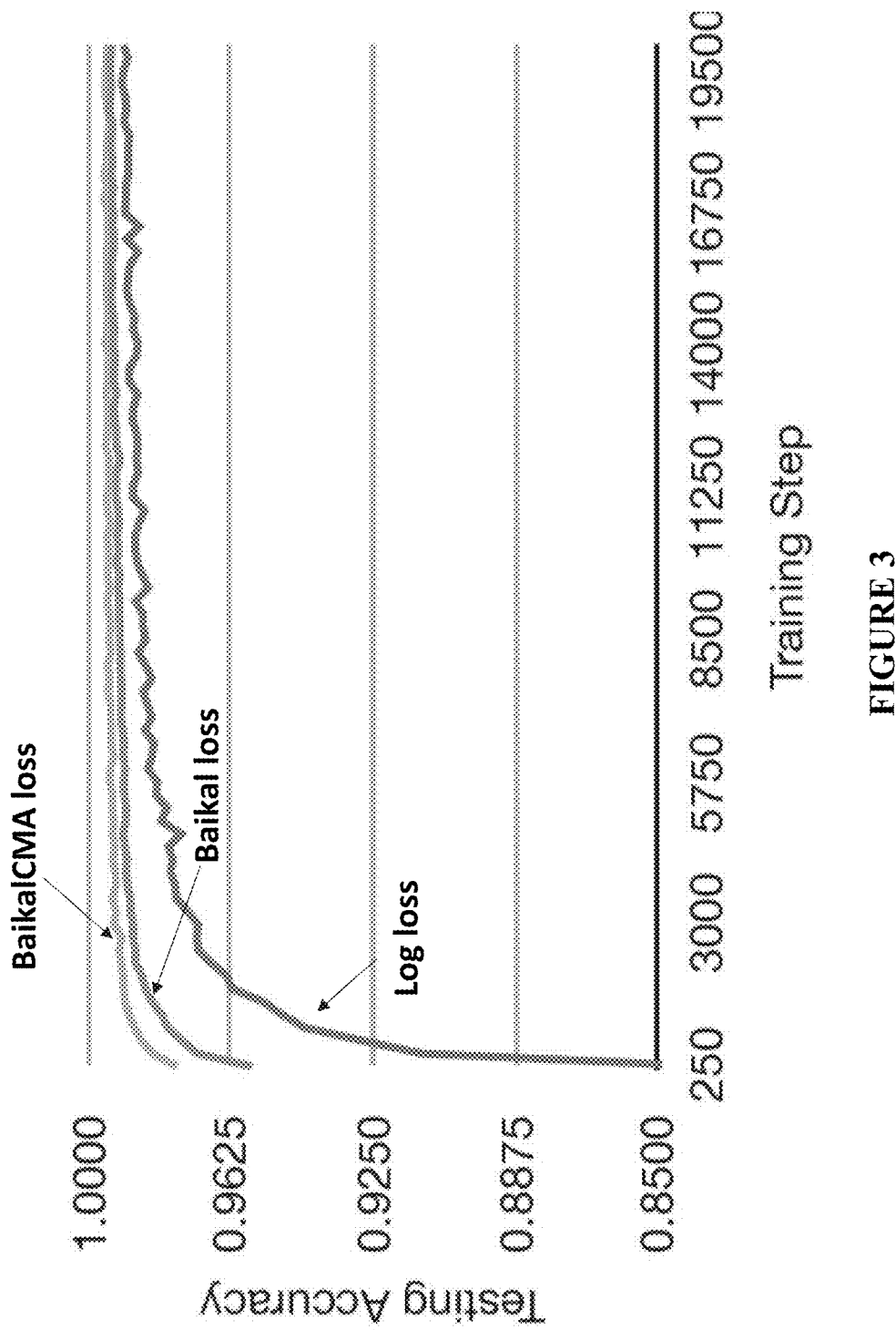
FIG. 3 compares training curves on a first representative dataset between prior art loss functions and loss functions discovered in accordance with one or more embodiments herein.

With regard to training speed, FIG. 3 shows training curves for different loss functions on MNIST. Baikal and BaikalCMA result in faster and smoother training compared to the cross-entropy loss. Each curve represents 80 testing dataset evaluations spread evenly (i.e., every 250 steps) throughout 20,000 steps of training on MNIST. Networks trained with Baikal and BaikalCMA both learn significantly faster than the cross-entropy loss. These phenomena make Baikal a compelling loss function for fixed time-budget training, where the improvement in resultant accuracy over the cross-entropy loss becomes most evident.

Figure 4:
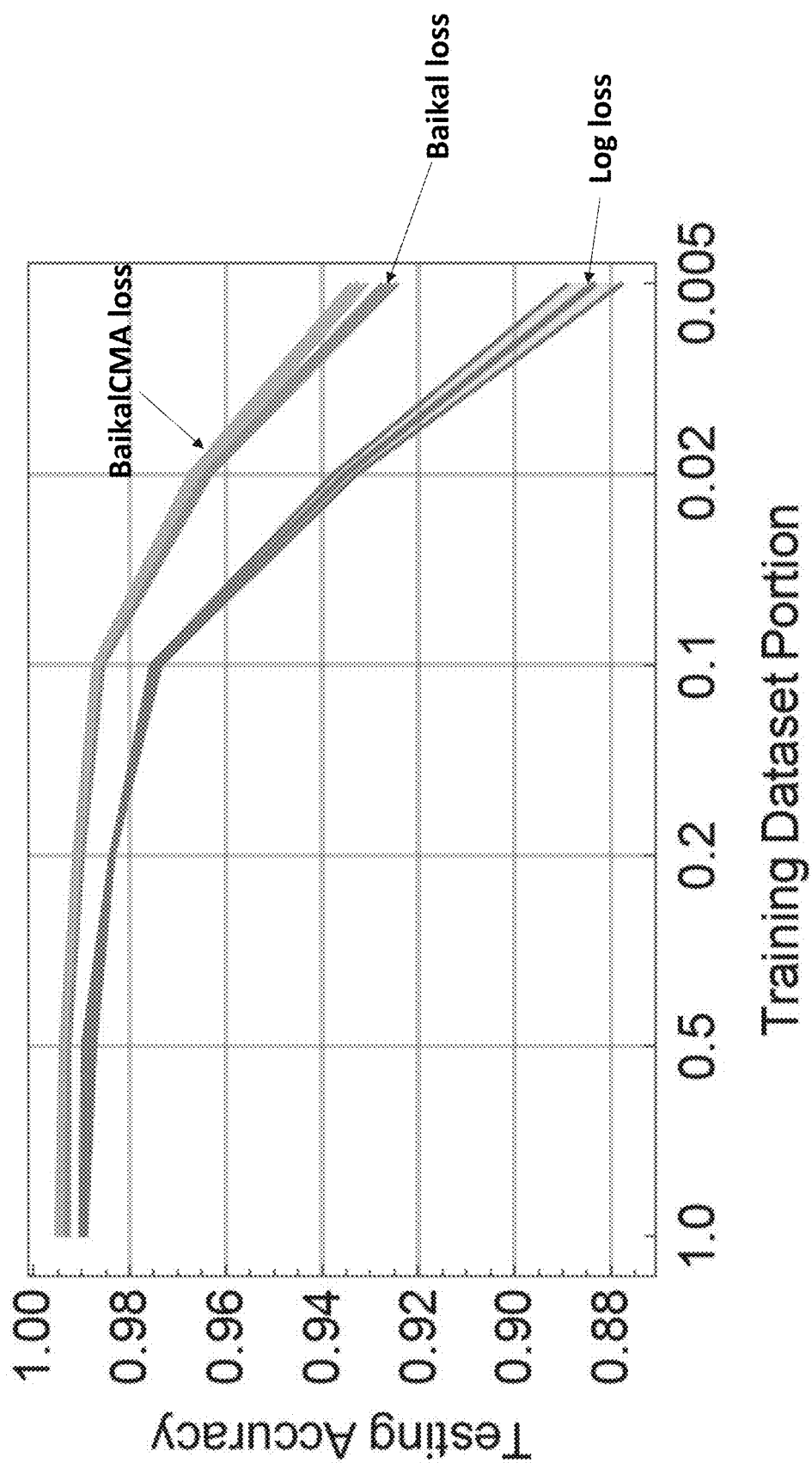
FIG. 4 compares sensitivity to different dataset sizes on a first representative dataset between prior art loss functions and loss functions discovered in accordance with one or more embodiments herein.

Regarding training data requirements, FIG. 4 provides an overview of the effects of dataset size on networks trained with cross-entropy loss, Baikal, and BaikalCMA. For each training dataset portion size, five individual networks were trained for each loss function. Due to frequent numerical instability exhibited by the cross-entropy loss on the 0.05 dataset portion, these specific experiments had to be run many times to yield five fully-trained networks; no other dataset portions exhibited instability. As in previous experiments, MNIST networks were trained for 20,000 steps.

The degree by which Baikal and BaikalCMA outperform cross-entropy loss increases as the training dataset becomes smaller. This provides evidence of less overfitting when training a network with Baikal or BaikalCMA. As expected, BaikalCMA outperforms Baikal at all tested dataset sizes. The size of this improvement in accuracy does not grow as significantly as the improvement over cross-entropy loss, leading to the belief that the overfitting characteristics of Baikal and BaikalCMA are very similar. Ostensibly, one could run the optimization phase of GLO on a reduced dataset specifically to yield a loss function with better performance than BaikalCMA on small datasets.

Figure 5:
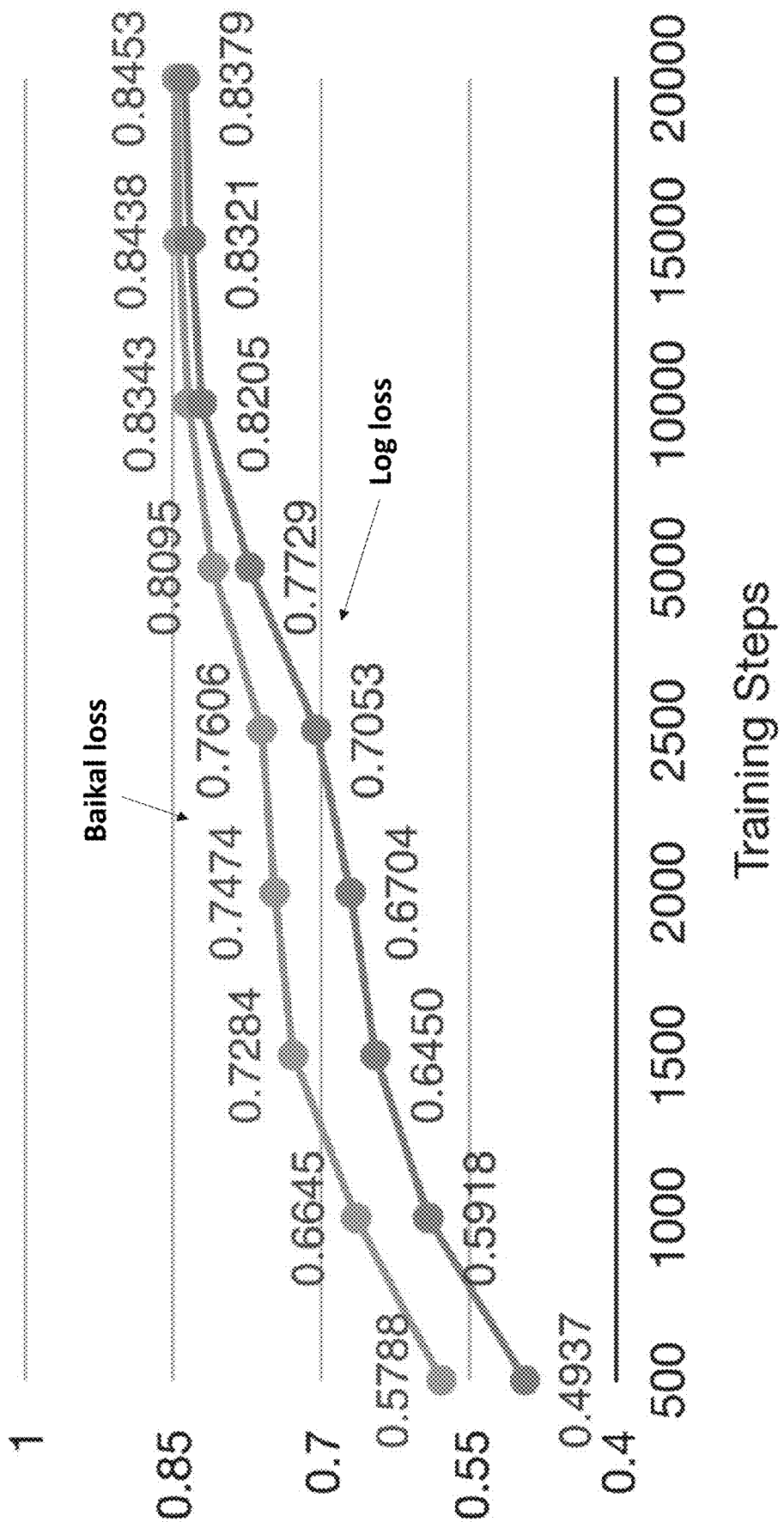
FIG. 5 compares testing accuracy on a second representative dataset between prior art loss functions and loss functions discovered in accordance with one or more embodiments herein.

FIG. 5 illustrates testing accuracy across varying training steps on CIFAR-10. The Baikal loss, which has been transferred from MNIST, outperforms the cross-entropy loss on all training durations. Specifically, FIG. 5 presents a collection of 18 separate tests of the cross-entropy loss and Baikal applied to CIFAR-10. Baikal is found to outperform cross-entropy across all training durations, with the difference becoming more prominent for shorter training periods. These results present an interesting use case for GLO, where a loss function that is found on a simpler dataset can be transferred to a more complex dataset while still maintaining performance improvements. This faster training provides a particularly persuasive argument for using GLO loss functions in fixed time-budget scenarios.

It is likely that Baikal's improvement over cross-entropy result from implicit regularization, which reduces overfitting. Loss functions used on the MNIST dataset, a 10-dimensional classification problem, are difficult to plot and visualize graphically. To simplify, loss functions are analyzed in the context of binary classification, with n=2, the Baikal loss expands to $$\mathcal{L}_{Baikal2D} = -\frac{1}{2}\left(\log(y_0) - \frac{x_0}{y_0} + \log(y_1) - \frac{x_1}{y_1}\right). \quad (3)$$

Since vectors x and y sum to 1, by consequence of being passed through a softmax function, for binary classification $x=\langle x_0, 1-x_0\rangle$ and $y=\langle y_0, 1-y_0\rangle$. This constraint simplifies the binary Baikal loss to the following function of two variables ($x_0$ and $y_0$):

$$\mathcal{L}_{Baikal2D} \propto -\log(y_0) + \frac{x_0}{y_0} - \log(1-y_0) + \frac{1-x_0}{1-y_0}. \quad (4)$$

This same methodology can be applied to the cross-entropy loss and BaikalCMA.

In practice, true labels are assumed to be correct with certainty, thus, $x_0$ is equal to either 0 or 1. The specific case where $x_0=1$ is plotted in FIG. 6 for the cross-entropy loss, Baikal, and BaikalCMA. Correct predictions lie on the right side of the graph, and incorrect ones on the left. The cross-entropy loss is shown to be monotonically decreasing, while Baikal and BaikalCMA counterintuitively show an increase in the loss value as the predicted label, $y_0$, approaches the true label $x_0$. This unexpected increase allows the loss functions to prevent the model from becoming too confident in its output predictions, thus providing a form of regularization. Further to FIG. 6, the minimum for the Baikal loss where $x_0=1$ lies near 0.71, while the minimum for the BaikalCMA loss where $x_0=1$ lies near 0.77. This minimum, along with the more pronounced slope around $x_0=0.5$ is likely a reason why BaikalCMA performs better than Baikal.

Figure 6:
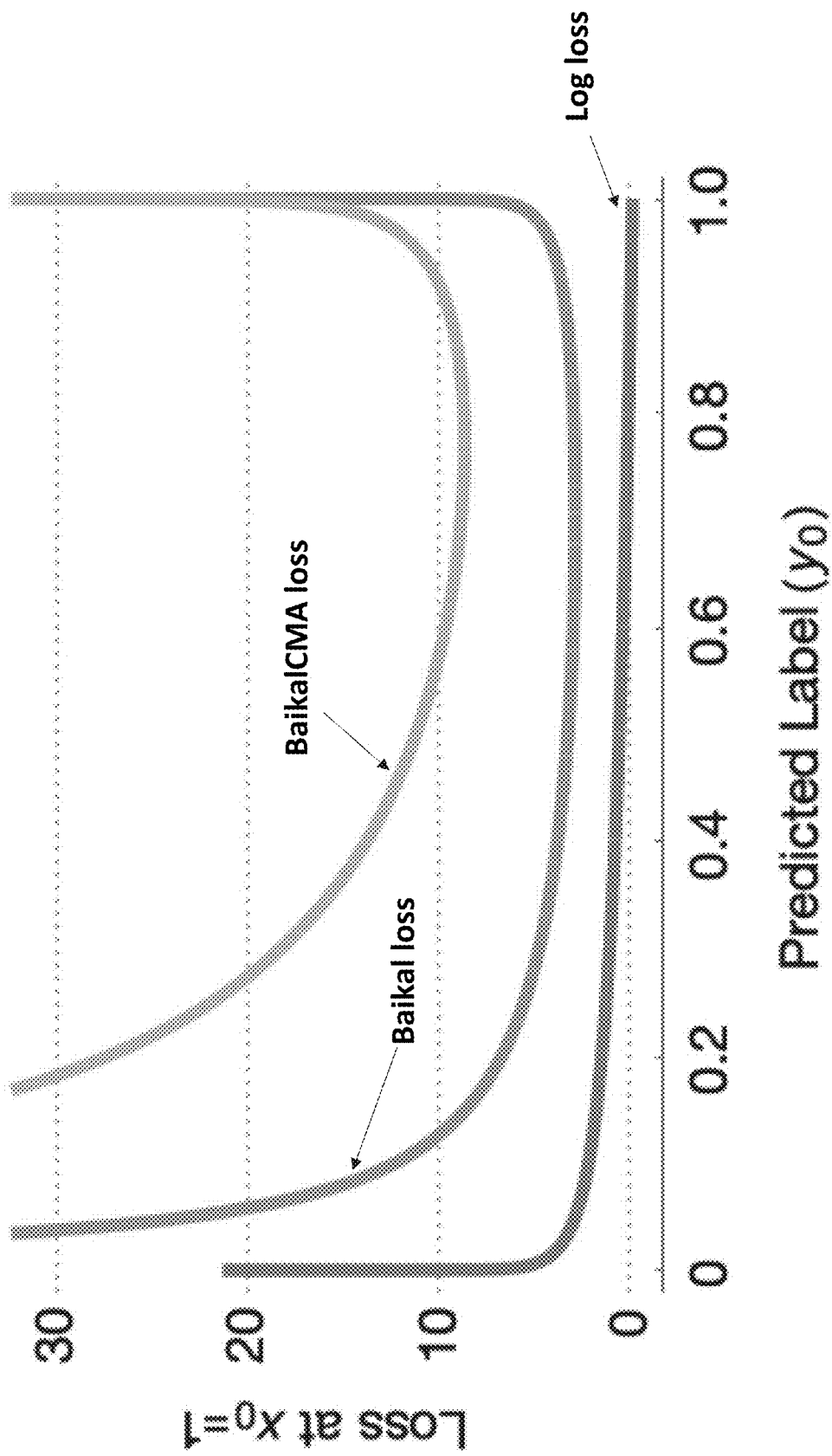
FIG. 6 compares binary classification loss functions on a first representative dataset between prior art loss functions and loss functions discovered in accordance with one or more embodiments herein.

The Baikal and BaikalCMA loss functions are surprising in that they incur a high loss when the output is very close to the correct value (as illustrated in FIG. 6). Although at first glance this behavior is counterintuitive, it may provide an important advantage. The outputs of a trained network will not be exactly correct, although they are close, and therefore the network is less likely to overfit. Thus, these loss functions provide an implicit form of regularization, enabling better generalization.

Figure 7:
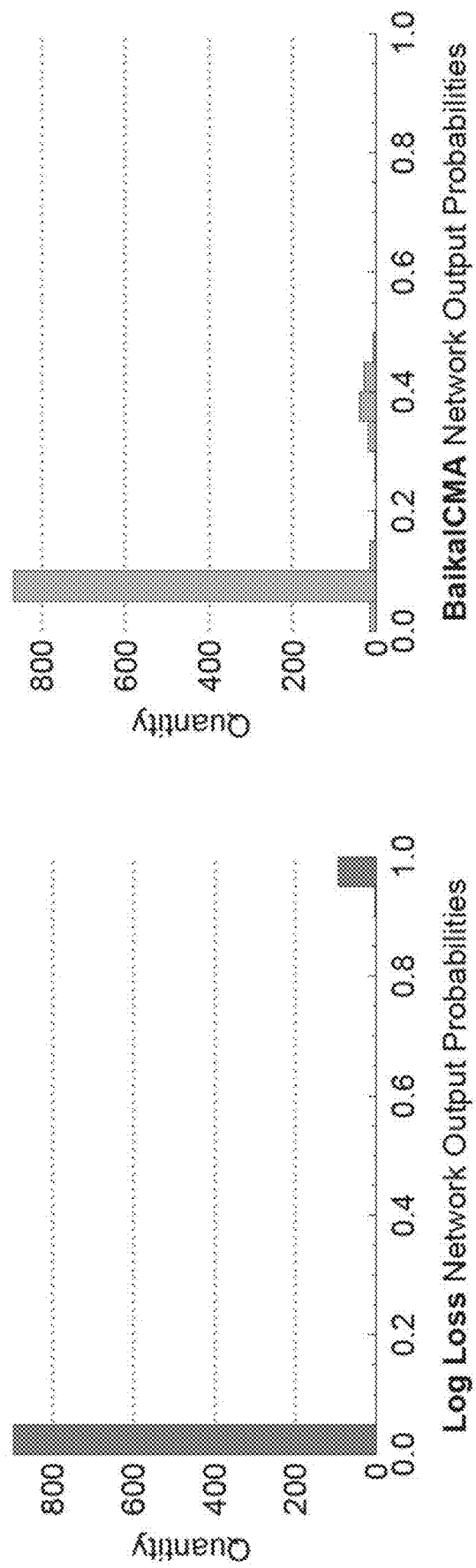
FIGS. 7a and 7b shows output probabilities of networks trained prior art loss function (FIG. 7a) and loss function discovered in accordance with one or more embodiments herein (FIG. 7b)

This effect is similar to that of the confidence regularizer, which penalizes low-entropy prediction distributions. The bimodal distribution of outputs that results from confidence regularization is nearly identical to that of a network trained with BaikalCMA. Note that while these outputs are typically referred to as probabilities in the literature, this is often an erroneous interpretation. Histograms of these distributions on the test dataset for cross-entropy and BaikalCMA networks, after 15,000 steps of training on MNIST, are shown in FIGS. 7a and 7b. The abscissae in FIGS. 7a and 7b match, making clear how the distribution for BaikalCMA has shifted away from the extreme values. The improved behavior under small-dataset conditions described above further supports implicit regularization; less overfitting was observed when using Baikal and BaikalCMA compared to the cross-entropy loss. Notably, the implicit regularization provided by Baikal and BaikalCMA complements the different types of regularization already present in the trained networks. As detailed above, MNIST networks are trained with dropout, and CIFAR-10 networks are trained with $L^2$ weight decay and local response normalization, yet Baikal is able to further improve performance.

In a further embodiment of the GLO process, the loss function discovery search space can be extended to include a network's unscaled logits (i.e., the output of a classification neural network before the softmax layer) as a potential leaf node. The addition of unscaled logits extends the base implementation of GLO discussed above to support loss functions that take three variables, rather than two. Conceptually, the availability of more information should allow the training process to learn in a more intelligent manner. It is well known to those skilled in the art that lifting information deep in a network closer to the output can yield significant improvements in training. Unscaled logits in particular can provide information on the network's raw, unnormalized outputs.

When running GLO with this expanded search space on MNIST, a new loss function, referred to as the FastLogit loss, that outperformed the Baikal loss was discovered:

$$\mathcal{L}_{FastLogit} = -\frac{1}{n}\sum_{i=0}^{n}(\tilde{y}_i - x_i) * \left(\frac{x_i}{y_i} - (\tilde{y}_i - (-2))\right), \quad (5)$$

where $\tilde{y}$ are the network's unscaled logits. Notably, this loss function is more complex than Baikal or the log loss, showing how evolution can use complexification to find better solutions.

Figure 8:
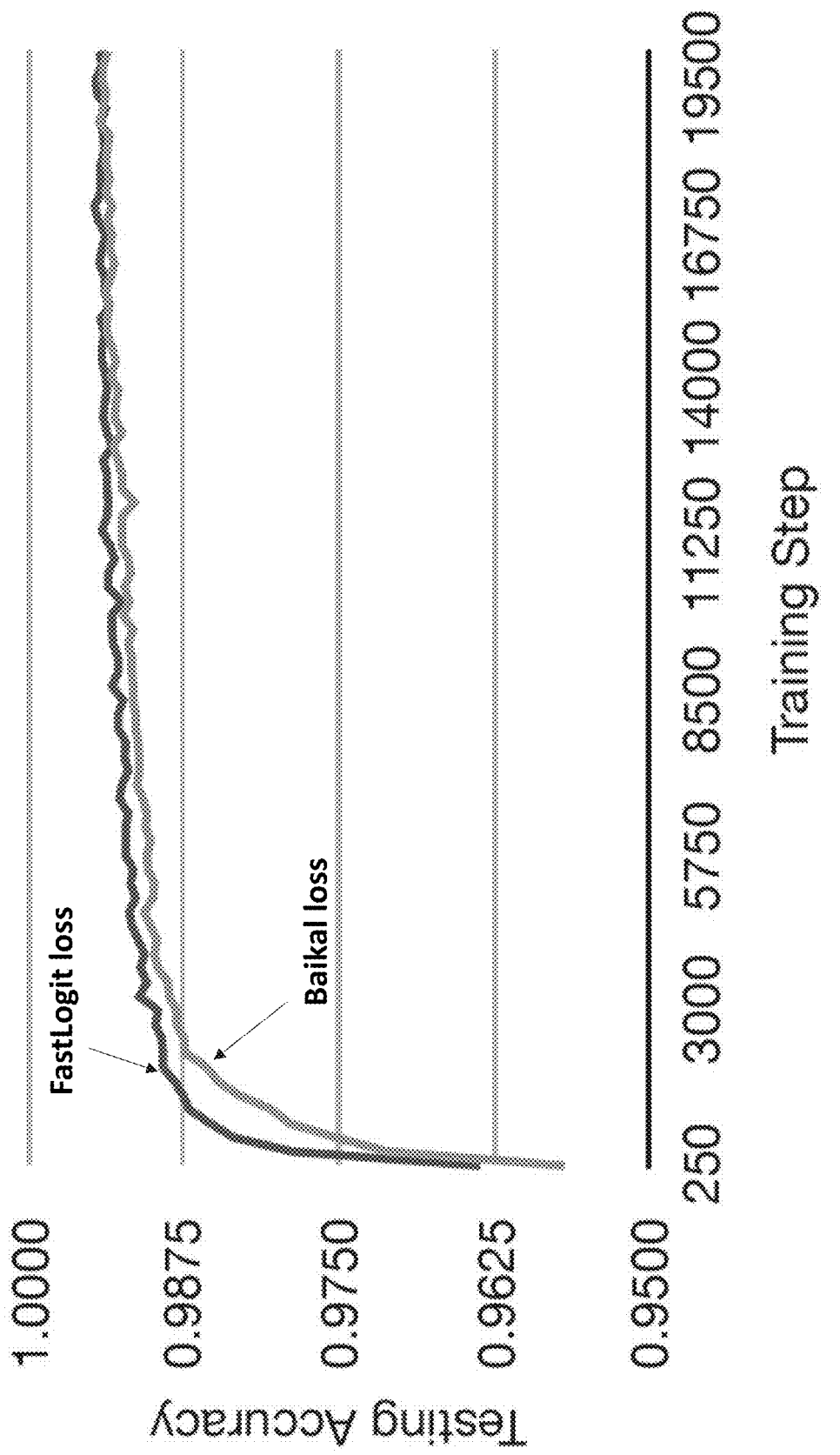
FIG. 8 shows training curves for multiple loss functions discovered in accordance with one or more embodiments herein.

The FastLogit loss is able to learn more quickly than Baikal, while converging to a comparable accuracy. FIG. 8 shows training curves for the FastLogit and Baikal loss functions on MNIST. FastLogit results in faster training compared to Baikal, with a comparable final accuracy. This improvement over Baikal provides compelling evidence for having search spaces that include more types of data. Additional improvements may result from inclusion of pre-existing regularization terms, such as an $L^2$ weight decay term, as optional leaf nodes. An alternative embodiment to this idea may be to forgo including regularization terms in GLO trees, and instead include them by default, with a coefficient of 0, in all loss functions, letting their importance be determined during the coefficient optimization step. Forgoing more freeform optimization of regularization terms as tree nodes would reduce the difficulties associated with larger search spaces in evolution.

The following hardware and software experiment implementation configurations are exemplary. One skilled in the art will recognize variations thereto while remaining fully within the scope of the embodiments.

Due to the large number of partial training sessions that are needed for both the discovery and optimization phases, training was distributed across the network to a cluster of dedicated machines that use HTCondor for scheduling. Each machine in this cluster has one NVIDIA GeForce GTX Titan Black GPU and two Intel Xeon E5-2603 (4 core) CPUs running at 1.80 GHz with 8 GB of memory. Training itself is implemented with TensorFlow in Python. The primary components of GLO (i.e., the genetic algorithm and CMA-ES) are implemented in Swift. These components run centrally on one machine and asynchronously dispatch work to the Condor cluster over SSH. Code for the Swift CMA-ES implementation is found in the Computer Program Listing Appendix hereto. One skilled in the art will recognize that processing performed on a singular machines may instead be performed across multiple machines. Similarly, data storage is not limited to any particular number of databases.

The present embodiments describe loss function discovery and optimization as a new form of metalearning, introducing an evolutionary computation approach. As described herein, evaluating GLO in the image classification domain, discovered new loss functions, Baikal and FastLogit. Baikal and FastLogit showed substantial improvements in accuracy, convergence speed, and data requirements over traditional loss functions.

GLO can be applied to other machine learning datasets and tasks. The approach is general, and can result in discovery of customized loss functions for different domains and/or specific datasets. For example, in the generative adversarial networks (GANs) domain, significant manual tuning is necessary to ensure that the generator and discriminator networks learn harmoniously. GLO could find co-optimal loss functions for the generator and discriminator networks in tandem, thus making GANs more powerful, robust, and easier to implement. GAN optimization is an example of co-evolution, where multiple interacting solutions are developed simultaneously. GLO could leverage co-evolution more generally: for instance, it could be combined with techniques like CoDeepNEAT to learn jointly-optimal network structures, hyperparameters, learning rate schedules, data augmentation, and loss functions simultaneously. Descriptions of exemplary co-evolution processes are described in co-owned U.S. patent application Ser. No. 15/794,913 entitled Cooperative Evolution of Deep Neural Network Structures which is incorporated herein by reference in its entirety. Though requiring significant computing power, GLO may discover and utilize interactions between the design elements that result in higher complexity and better performance than is currently possible. GLO can be combined with other aspects of metalearning in the future, paving the way to robust and powerful AutoML.

The applications for AutoML and the improved loss function discovery and optimization described herein are virtually unlimited. Such processes can solve real-world problems in nearly any domain and industry including, but not limited to: financial services, e.g., fraud detection, trading strategies, portfolio profiling; Government agencies, e.g., public safety (contraband detection, facial recognition), utilities (e.g., service disruption, theft, routing); health care, e.g., wearable devices and sensors for health assessment in real time, pattern recognition/data trends to identify red flags and improved diagnoses and treatment; Websites, e.g., analysis of consumer buying history for offer/marketing customization through social media, e-mail, etc.; Oil and gas, e.g., identification of new sources, protection of plants and refineries, distribution refinement; transportation, e.g., route efficiency; cybersecurity; imaging and sensing data analysis; language processing.

One skilled in the art recognizes that variations may be made to many aspects of the overall implementation discussed herein, such as, but not limited to, variations to training aspects and that such variations fall within the scope of the present invention.

The invention claimed is:

1. A process for partially training a neural network to discover and optimize a candidate loss function comprising:
   initiating by a genetic algorithm running on at least one processor a random population of candidate loss functions composed of randomly generated trees with a maximum depth of two, wherein recursively and starting from a root of the randomly generated trees, tree nodes are randomly selected from predetermined sets of unary operators and binary operators in accordance with weighting wherein log($\circ$), x, y are three times as likely as and $\sqrt{\circ}$ is two times as likely as +, *, −, ÷, 1, −1 and leaf nodes are selected from the group consisting of x, y, 1, −1, where x represents a true label, and y represents a predicted label, further wherein each candidate loss function includes a set of optimizable coefficients;
   (i) training by the genetic algorithm the random population of candidate loss functions on training data;
   (ii) evaluating by the genetic algorithm a fitness of each candidate loss function based on a performance thereof on the training data in accordance with a fitness function, wherein candidate loss functions that do not contain both at least one x and at least one y are automatically assigned a fitness of 0;
(iii) selecting by the genetic algorithm one or more select candidate loss functions in accordance with the fitness evaluations;
(iv) reproducing by the genetic algorithm new candidate loss functions using the select candidate loss functions in accordance with reproduction processes to establish and discover a next population of candidate loss functions;
(v) repeating steps (i) to (iv) for $n^{th}$ generations;
selecting by the genetic algorithm one or more best candidate loss functions in accordance with the fitness evaluations from an $n^{th}$ generation population of candidate functions;
optimizing by an optimization process running on at least one processor the set of coefficients of each of the one or more best candidate loss functions wherein the optimization process is a covariance-matrix adaptation evolutionary strategy (CMA-ES); and
implementing an optimized best candidate loss function to train one or more predictive models.

2. The process according to claim 1, wherein the reproduction processes include recombination and mutation.

3. The process according to claim 1, wherein the set of coefficients is represented by a vector with dimensionality equal to the number of nodes in the best candidate loss function's tree.

4. The process according to claim 1, wherein the CMA-ES is a variant ($\mu/\mu$, $\lambda$)-CMA-ES, which incorporates weighted rank-$\mu$ updates.

5. The process according to claim 1, wherein the one or more predictive models is a classification model.

6. A computer-readable medium storing instructions that, when executed by a computer, perform a process for partially training a neural network to discover and optimize a candidate loss function comprising:
initiating a random population of candidate loss functions composed of randomly generated trees with a maximum depth of two, wherein recursively and starting from a root of the randomly generated trees, tree nodes are randomly selected from predetermined sets of unary operators and binary operators in accordance with weighting wherein log($\circ$), x, y are three times as likely as and $\sqrt{\circ}$ is two times as likely as +, *, −, ÷, 1, −1 and leaf nodes are selected from the group consisting of x, y, 1, −1, where x represents a true label, and y represents a predicted label, further wherein each candidate loss function includes a set of optimizable coefficients;
(i) training the random population of candidate loss functions on training data;
(ii) evaluating a fitness of each candidate loss function based on a performance thereof on the training data in accordance with a fitness function, wherein candidate loss functions that do not contain both at least one x and at least one y are automatically assigned a fitness of 0;
(iii) selecting one or more select candidate loss functions in accordance with the fitness evaluations;
(iv) reproducing using the select candidate loss functions in accordance with reproduction processes to establish and discover a next population of candidate loss functions;
(v) repeating steps (i) to (iv) for $n^{th}$ generations;
selecting one or more best candidate loss functions in accordance with the fitness evaluations from an $n^{th}$ generation population of candidate functions;
optimizing the set of coefficients of each of the one or more best candidate loss functions using an optimization process wherein the optimization process is a covariance-matrix adaptation evolutionary strategy (CMA-ES); and
implementing an optimized best candidate loss function to train one or more predictive models.

7. The computer-readable medium according to claim 6, wherein the reproduction processes include recombination and mutation.

8. The process according to claim 6, wherein the set of coefficients is represented by a vector with dimensionality equal to the number of nodes in the best candidate loss function's tree.

9. The process according to claim 6, wherein the CMA-ES is a variant ($\mu/\mu$, $\lambda$)-CMA-ES, which incorporates weighted rank-$\mu$ updates.

10. The computer-readable medium according to claim 6, wherein the one or more predictive models is a classification model.

11. An automated machine learning process comprising:
generating a population of candidate loss functions composed of randomly generated trees with a maximum depth of two, wherein recursively and starting from a root of the randomly generated trees, tree nodes are randomly selected from predetermined sets of unary operators and binary operators in accordance with weighting wherein log($\circ$), x, y are three times as likely as and $\sqrt{\circ}$ is two times as likely as +, *, −, ÷, 1, −1 and leaf nodes are selected from the group consisting of x, y, 1, −1, where x represents a true label, and y represents a predicted label;
evolving the randomly generated candidate loss functions by a genetic algorithm running on at least one processor and selecting one or more best candidate loss functions in accordance with a fitness evaluation;
optimizing by an optimization process running on at least one processor a set of coefficients of each of the one or more best candidate loss functions, wherein the set of coefficients is represented by a vector with dimensionality equal to the number of nodes in the best candidate loss function's tree and the optimization process is a covariance-matrix adaptation evolutionary strategy (CMA-ES); and
implementing an optimized best candidate loss function to train one or more predictive models.

12. The process according to claim 11, wherein the CMA-ES is a variant ($\mu/\mu$, $\lambda$)-CMA-ES, which incorporates weighted rank-$\mu$ updates.

13. The computer-readable medium according to claim 11, wherein the one or more predictive models is a classification model.

14. An automated machine learning system comprising:
a first subsystem including at least one processor programmed to perform a process of generating a population of candidate loss functions composed of randomly generated trees with a maximum depth of two, wherein recursively and starting from a root of the randomly generated trees, tree nodes are randomly selected from predetermined sets of unary operators and binary operators in accordance with weighting wherein log($\circ$), x, y are three times as likely as and $\sqrt{\circ}$ is two times as likely as +, *, −, ÷, 1, −1 and leaf nodes are selected from the group consisting of x, y, 1, −1, where x represents a true label, and y represents a predicted label;

a second subsystem including at least one processor programmed to perform a process of evolving candidate loss functions and selecting one or more best candidate loss functions in accordance with a fitness evaluation, wherein the candidate loss function is a tree having multiple nodes and the programmed process for evolving candidate loss functions is a genetic algorithm;

a third subsystem including at least one processor programmed to perform a process of optimizing a set of coefficients of each of the one or more best candidate loss functions, wherein the set of coefficients is represented by a vector with dimensionality equal to the number of nodes in the best candidate loss function's tree and the programmed process optimizing a set of coefficients of each of the one or more best candidate loss functions is a covariance-matrix adaptation evolutionary strategy (CMA-ES); and a fourth subsystem including at least one processor programmed to perform a process of implementing an optimized best candidate loss function to train one or more predictive models.

15. The automated machine learning system of claim 14, wherein the CMA-ES is a variant $(\mu/\mu, \lambda)$-CMA-ES, which incorporates weighted rank-$\mu$ updates.

16. The automated machine learning system of claim 14, wherein the one or more predictive models is a classification model.

* * * * *